United States Patent
Yau et al.

(10) Patent No.: US 10,827,544 B1
(45) Date of Patent: Nov. 3, 2020

(54) METHODS AND SYSTEMS FOR 5G TRAFFIC ROUTING IN IPX WITH NETWORK SLICING

(71) Applicant: Syniverse Technologies, LLC, Tampa, FL (US)

(72) Inventors: Edward Yau, Tseung Kwan O (HK); Huiyue Xu, Tampa, FL (US); Prashant Datar, Tampa, FL (US); Ravi Tandon, Sandweiler (LU); Rakesh Mehta, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/847,079

(22) Filed: Apr. 13, 2020

Related U.S. Application Data

(60) Provisional application No. 62/833,347, filed on Apr. 12, 2019.

(51) Int. Cl.
| | |
|---|---|
| *H04W 76/12* | (2018.01) |
| *H04W 8/02* | (2009.01) |
| *H04W 40/12* | (2009.01) |
| *H04W 40/20* | (2009.01) |

(52) U.S. Cl.
CPC ............ *H04W 76/12* (2018.02); *H04W 8/02* (2013.01); *H04W 40/12* (2013.01); *H04W 40/20* (2013.01)

(58) Field of Classification Search
CPC ....... H04W 76/12; H04W 8/02; H04W 40/12; H04W 40/20
See application file for complete search history.

(56) References Cited

U.S. PATENT DOCUMENTS

| | | | |
|---|---|---|---|
| 10,568,061 B1* | 2/2020 | Park | H04W 76/22 |
| 2020/0178112 A1* | 6/2020 | Youn | H04W 88/08 |

OTHER PUBLICATIONS

3GPP TS23.501 "3rd Generation Partnership Project; Technical Specification Group Services and System Aspects; System Architecture for the 5G System; Stage 2" Jun. 2018.

(Continued)

*Primary Examiner* — Minjung Kim
(74) *Attorney, Agent, or Firm* — Andriy Lytvyn; Smith & Hopen, P.A.

(57) ABSTRACT

A system and method for routing of 5G mobile data traffic along a routing path in an Internetwork Packet Exchange (IPX) network having requisite Quality of Service (QoS). A proxy is deployed in the IPX network to intercept Session Create request and response messages exchanges between the home network and the visited network. The routing platform extracts Single-Network Slice Selection Assistance Information (S-NSSAI) attribute and uses this attribute and the geographic locations of the visited network and the home network to select a routing path in the IPX network having requisite QoS for the network slice use case. The routing platform uses layer-3 routing technique to anchor User Plane Function (UPF) Proxies deployed at different routing paths in the IPX network. Alternately, the routing platform uses layer-2 routing technique, with Software-Defined Networking (SDN) controller and SDN-switches to route traffic via the selected routing path in the IPX network.

9 Claims, 7 Drawing Sheets

(56) References Cited

OTHER PUBLICATIONS

3GPP TS23.502 "3rd Generation Partnership Project; Technical Specification Group Services and System Aspects; Procedures for the 5G System; Stage 2" Jun. 2018.
3GPP TS28.530 "3rd Generation Partnership Project; Technical Specification Group Services and System Aspects; Telecommunication management; Management and orchestration of 5G networks; Concepts, use cases and requirements" Oct. 2018.
3GPP TS28.531 "3rd Generation Partnership Project; Technical Specification Group Services and System Aspects; Management and orchestration of 5G networks; Provisioning" Oct. 2018.
3GPP TS28.532 "3rd Generation Partnership Project; Technical Specification Group Services and System Aspects; Management and orchestration of networks and network slicing; Provisioning" Oct. 2018.
TS28.533 "3rd Generation Partnership Project; Technical Specification Group and System Aspects; Management and orchestration; Architecture framework" Oct. 2018.
International Search Report and Written Opinion dated Jul. 17, 2020 for corresponding PCT International Application No. PCT/US20/27949.

* cited by examiner

FIG. 2

METHODS AND SYSTEMS FOR 5G TRAFFIC ROUTING IN IPX WITH NETWORK SLICING

PRIORITY CLAIM

This non-provisional application claims priority to a U.S. Provisional Application having Ser. No. 62/833,347 filed on Apr. 12, 2019.

BACKGROUND OF THE INVENTION

1. Field of the Invention

This invention relates generally to the field of telecommunications networks. More specifically, the invention relates to methods and systems of routing 5G mobile data traffic along Interment Protocol (IP) paths with different Quality of Service (QoS) in Internetwork Packet Exchange (IPX) networks based on network slicing information in a Protocol Data Unit (PDU) session between a mobile device and the Public Data Network (PDN).

2. Brief Description of the Related Art

One of the key advantages of 5G telecommunications networks is the ability to allocate the appropriate network resources based on the type of a mobile device. This feature is referred to as "network slicing." In the context of 5G networks, 3GPP defines "network slicing" as a technology for providing a logic end-to-end network from a mobile device to the PDN.

Network slicing enables operators to provide logical networks of different quality of service (QoS) for each 5G use case. Use cases in 5G are broadly divided into three categories, Enhanced Mobile Broadband (eMBB), Massive Internet of Things (mIoT), and Ultra-Reliable and Low Latency Communications (uRLLC). Network slicing enables 5G networks to accommodate the unique characteristics and requirements of each use case category by selecting network paths having appropriate bandwidth, latency, reliability, cost, and concurrency.

Although network slicing is often seen as the future of telecommunication networks, implementing network slicing in roaming scenarios presents serious challenges. One such challenge pertains to implementation of network slicing in Internetwork Packet Exchange (IPX) networks, which were established by GSM Association (GSMA) to provide network interconnectivity between mobile operators. Many network operators rely on IPX to establish interconnectivity with their roaming partners to provide mobile roaming services to their subscribers. Mobile roaming refers to a scenario in which a mobile subscriber of a Home Public Land Mobile Network (HPLMN) operator is using mobile service in a foreign location provided by a Visited Public Land Mobile Network (VPLMN).

In 5G mobile roaming, there are two common approaches for mobile devices to access the Public Data Network (PDN)—"local breakout" and "home-routed." In local breakout roaming scheme, user traffic is routed to the Internet directly from the VPLMN. In contrast, in the home-routed scenario, user traffic is routed to HPLMN to reach the Internet. Home-routed is the more widely adopted roaming scheme because it provides the HPLMN operator greater control over the service quality and user experience.

When the HPLMN and the VPLMN interconnect via an IPX network and employ home-routed roaming scheme, both signaling and user payload of mobile device traffic traverse the IPX network. To enable roaming mobile devices to take full advantage of the network slicing feature of 5G, the user traffic traversing the IPX network must be sorted based on the mobile device use case category—i.e., eMBB, mIoT, and uRLLC. However, in the current state of the art, there is no solution for efficiently and effectively implementing network slicing in an IPX network.

3. References 5G system architecture is described in 3GPP TS23.501 "3rd Generation Partnership Project; Technical Specification Group Services and System Aspects; System Architecture for the 5G System; Stage 2" and TS23.502 "3rd Generation Partnership Project; Technical Specification Group Services and System Aspects; Procedures for the 5G System; Stage 2". Detailed of network slicing are described in 3GPP TS28.530 "3rd Generation Partnership Project; Technical Specification Group Services and System Aspects; Telecommunication management; Management and orchestration of 5G networks; Concepts, use cases and requirements", TS28.531 "3rd Generation Partnership Project; Technical Specification Group Services and System Aspects; Management and orchestration of 5G networks; Provisioning; ", TS28.532 "3rd Generation Partnership Project; Technical Specification Group Services and System Aspects; Management and orchestration of networks and network slicing; Provisioning" and TS28.533 "3rd Generation Partnership Project; Technical Specification Group and System Aspects; Management and orchestration; Architecture framework".

SUMMARY OF THE INVENTION

This invention pertains to methods and systems for routing 5G user data along Internet Protocol (IP) routing paths with different QoS in an IPX network based on the network slicing information in PDU Session Establishment to address the specific needs of 5G applications.

In an embodiment, the invention pertains to a method of routing 5G roaming mobile data traffic between a visited public land mobile network (VPLMN) and a home public land mobile network (HPLMN), which are interconnected via an Internetwork Packet Exchange (IPX) network. The IPX network has a plurality of predefined routing paths having different QoS. When the VPLMN sends a Protocol Data Unit (PDU) Session Create request message, this message is captured by 5G HyperText Transfer Protocol (HTTP)/2 Proxy deployed at the IPX network. The captured PDU Session Create request message carries a Single-Network Slice Selection Assistance Information (S-NSSAI) value and an IP address of a visited User Plane Function (v-UPF) selected by the VPLMN for this PDU session.

Next, 5G HTTP/2 Proxy identifies the S-NSSAI value within the captured PDU Session Create request message. Based on the identified S-NSSAI value, 5G HTTP/2 Proxy selects a routing path from the plurality of predefined routing paths in the IPX network. The selected routing path is configured to provide requisite QoS for data traffic type corresponding to the S-NSSAI value. In an embodiment, the selected routing path is associated with a UPF-Proxy deployed in the IPX network.

After selecting the UPF-Proxy, the 5G HTTP/2 Proxy modifies the PDU Session Create Request message by replacing the IP address of the v-UPF with an IP address of the selected UPF-Proxy. The modified PDU Session Create request message is sent to the HPLMN. The HPLMN selects a home User Plane Function (h-UPF) and responds with a PDU Session Create response message.

The 5G HTTP/2 Proxy captures the PDU Session Create response message and selects the routing path within the IPX network for data traffic from the HPLMN to the VPLMN (downlink traffic). The 5G HTTP/2 Proxy modifies the PDU Session Create response message by replacing the IP address of the h-UPF with an IP address of a UPF-Proxy associated with the selected routing path for the downlink data traffic. The routing path for the uplink traffic can be the same as the routing path selected for the downlink traffic or, alternatively, the two routing paths can be different. (The data traffic in which downlink packets and uplink traffic traverse different routing paths is known as asymmetric traffic.)

Next, the 5G HTTP/2 Proxy sends the modified PDU Session Create response message to the VPLMN. After PDU session is created, subsequent uplink data packets from the VPLMN to the HPLMN are delivered to the UPF-Proxy via the selected routing path in the IPX network. For asymmetric traffic, subsequent downlink data packets from the HPLMN to the VPLMN can be delivered to a different UPF-Proxy via another routing path in the IPX network. For symmetric traffic, the same UPF-Proxy is used for both uplink and downlink data packets.

In an embodiment, the 5G HTTP/2 Proxy modifies the PDU Session Create request and response messages by replacing an 'ipv4Addr' value or an 'ipv6Addr' value in a 'vcnTunnelInfo' attribute with the IP address of the selected UPF-Proxy.

Each routing path in the IPX network has one or more parameters associated with a 5G use case, wherein the use cases include an Enhanced Mobile Broadband (eMBB), Massive Internet of Things (mIoT), and Ultra-Reliable and Low Latency Communications (uRLLC). Some of the parameters associated with these 5G cases include bandwidth, latency, cost, capacity, and reliability.

In an embodiment, one or more Software-Defined Networking (SDN) switches may be deployed in the IPX network. In this embodiment, the 5G HTTP/2 Proxy communicates with a General Packet Radio Service Tunneling Protocol (GTP) Steering Controller to establish a rule according to which the SDN switches steer data traffic via the selected routing paths. The GTP Steering Controller acts as an Openflow Controller to control the SDN switches to steer data packets.

In an embodiment, the invention pertains to networking and application systems that include the following components: (1) a 5G HTTP/2 Proxy that proxies N16 messages between v-SMF and h-SMF; (2) a UPF Proxy that proxies N9 packets between v-UPF and h-UPF; and (3) a General Packet Radio Service Tunneling Protocol (GTP) Steering Controller that acts as an Openflow Controller to control Software-Defined Networking (SDN) switches to steer GTP-U packets.

When a mobile device attempts to establish a data session, the Access and Mobility Management Function (AMF) in the VPLMN sends a 'Nsmf_PDUSession_CreateSMContext' request to v-SMF (N11 interface). V-SMF executes a UPF selection procedure and sends a 'Nsmf_PDUSession_Create' request to h-SMF. This request carries the S-NSSAI and v-UPF-IP and is traversed through a 5G HTTP/2 Proxy in the IPX network. The 5G HTTP/2 Proxy captures the S-NSSAI and the IP address of the v-UPF within the request message and the IP address of the h-VPU within the corresponding response message from h-SMF to v-SMF. The 5G HTTP/2 Proxy determines the best routing path for user payload traffic based on the S-NSSAI and VPLMN and HPLMN identities which indicate their geographical locations.

In an embodiment, mobile device traffic is steered with layer-3 routing technique by deploying UPF-Proxy at different path/links in IPX network. The 5G HTTP/2 Proxy manipulates the 'vcnTunnelInfo' and 'hcnTunnelInfo' attributes in 'Nsmf_PDUSession_Create' request and response messages respectively, and replaces the UPF ipv4Addr (or ipv6Addr) in these attributes with the selected UPF-Proxy's IP for the desired routing path.

In another embodiment, mobile device traffic is steered with layer-2 routing technique by deploying SDN-switches that can route traffic along different path/links in IPX network. A 'GTP Steering Controller' acts as an SDN-Controller that supports the OpenFlow protocol. It obtains the S-NSSAI information from the 5G HTTP/2 Proxy and installs rules at SDN-switches to examine and route GTP-U packets to the desired path. The OpenFlow matching rules specify the 5-tuples of IP flow between v-UPF and h-UPF (source-IP, destination-IP, source-port, destination-port, protocol-id), together with the uplink and downlink tunnel ID of GTP-U packets. The OpenFlow action rules specifies which egress network interface/port the traffic shall be delivered to.

BRIEF DESCRIPTION OF THE DRAWINGS

For a fuller understanding of the invention, reference should be made to the following detailed disclosure, taken in connection with the accompanying drawings, in which:

FIG. 2 is a diagram schematically depicting the data structure of PDU Session Create (Nsmf_PDUSession_Create) request and response messages. Information elements for GTP-U tunnel information and S-NSSAI are shown in the diagram.

DETAILED DESCRIPTION OF THE PREFERRED EMBODIMENT

Figure 1:
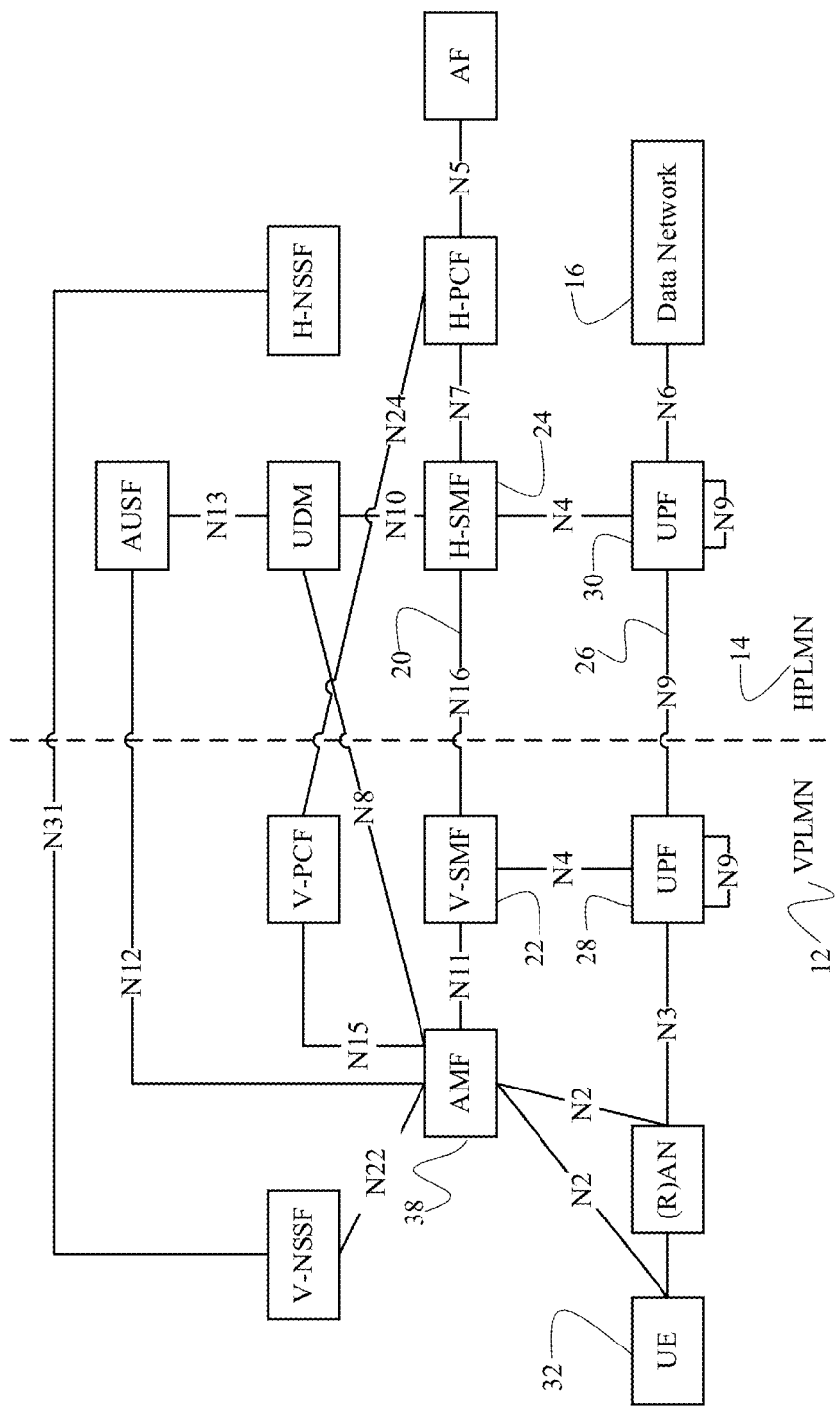
FIG. 1 is a block diagram schematically depicting the 5G roaming architecture in a home-routed scenario, in which mobile user data from the VPLMN is sent back to the HPLMN to reach the PDN network.

FIG. 1 depicts 5G roaming architecture for home-routed traffic in a scenario in which the Home Public Land Mobile Network (HPLMN) 12 and the Visited Public Land Mobile Network (VPLMN) 14 interconnect directly, without using an Internetwork Packet Exchange (IPX) network. In this scenario, mobile user data is sent from User Equipment (UE) 16, which is roaming in VPLMN 12, back to HPLMN 14 to reach a Public Data Network (PDN) 16. The network interface in this scenario includes the following: (1) N16 interface 20 between a visited Session Management Function (v-SMF) 22 and a home Session Management Function (h-SMF) 24; and (2) N9 interface 26 between a visited User Plane Function (v-UPF) 28 and a home User Plane Function (h-UPF) 30.

According to TS23.502, network slice selection procedure happens at registration and Protocol Data Unit (PDU) session establishment procedure. During PDU session establishment, network slice selection procedure is used to select the appropriate v-UPF 28 on the visited network side and, also, to select the appropriate h-UPF 30 on the home network side. The v-UPF 28 and h-UPF 30 are selected based on the type of the use case—e.g., Enhanced Mobile Broadband (eMBB), Massive Internet of Things (mIoT), and Ultra-Reliable and Low Latency Communications (uRLLC).

In a home-routed roaming scenario, the PDU session establishment procedure begins with User Equipment (UE) 32 sending a PDU session establishment request to Access and Mobility Management Function (AMF) 38. Next, AMF 38 sends a PDU Session Create request ('Nsmf_PDUSession_CreateSMContext Request') to v-SMF 22, to which v-SMF 22 replies with a response back to AMF 38. Then, v-SMF 22 selects an appropriate v-UPF 28 for this session based on the type of use case.

After selecting the appropriate v-UPF 28, VPLMN 12 communicates this information to HPLMN 14. This step is accomplished by v-SMF 22 sending a PDU Session Create request ('Nsmf_PDUSession_Create') to h-SMF 24. The PDU Session Create request carries a Single-Network Slice Selection Assistance Information (S-NSSAI) 40 attribute and tunnel information for v-UPF 28. Next, HPLMN 14 selects the appropriate h-UPF 30 on the home-network side. To select the appropriate h-UPF 30, h-SMF 24 executes a UPF selection procedure. After selecting the appropriate h-UPF 30, h-SMF 24 replies to v-SMF 22 with a PDU Session Create response ('Nsmf_PDUSession_Create Response'), which carries the tunnel information for the selected h-UPF 30.

Figure 2:
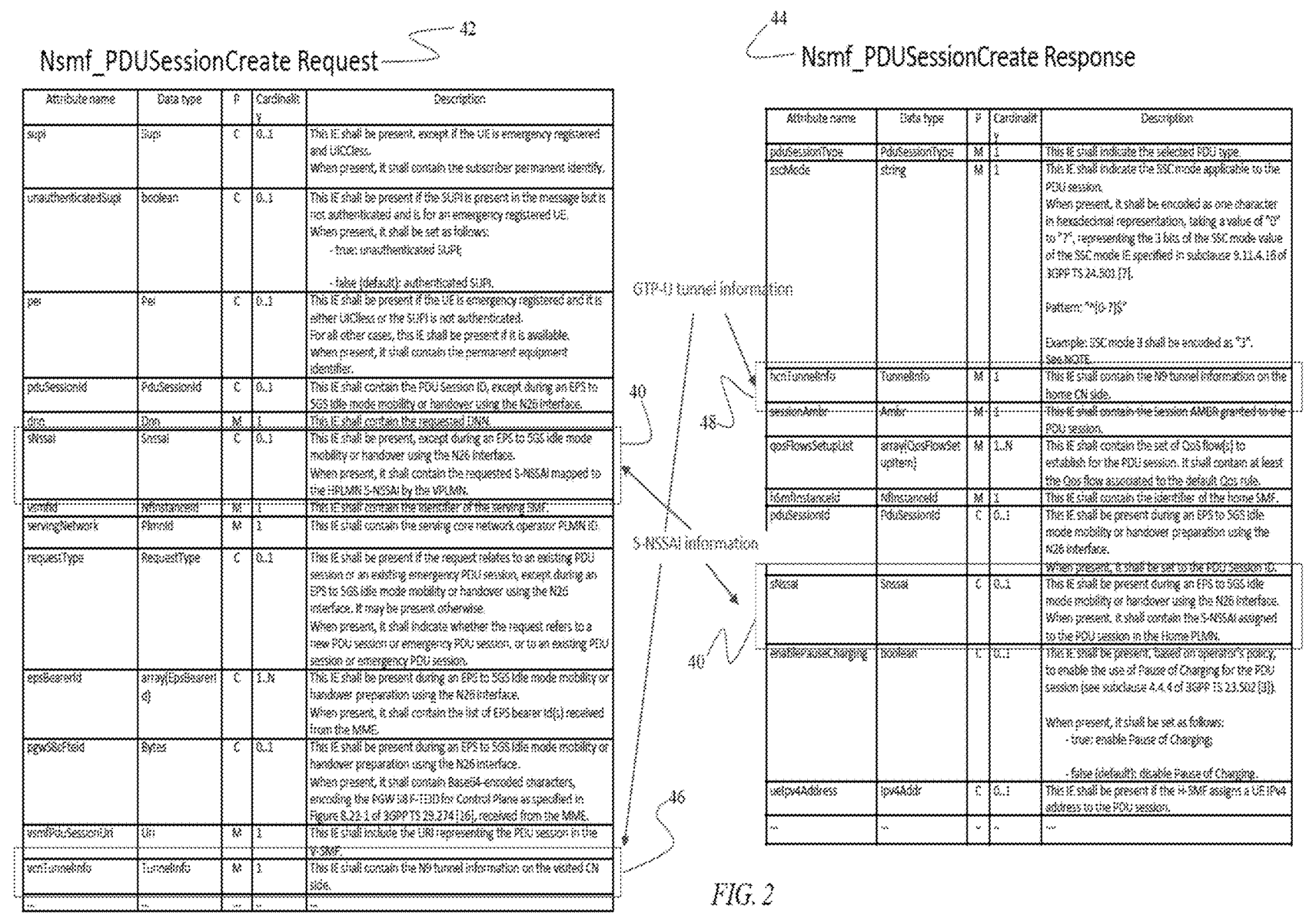

The structures of PDU Session Create Request message 42 and PDU Session Create Response message 44 are depicted in FIG. 2. In 5G networks, each network slice is identified by an attribute known as S-NSSAI 40, which indicates the category of the desired service (eMBB, mIoT, uRLLC, etc). S-NSSAI 40 comprises the following two identifiers: (1) a mandatory Slice-Service Type (SST), which is an integer (0 to 255) identifying the slice type and (2) Slice Differentiator (SD) to further differentiate slices of the same SST. UE 32 may establish up to 8 slices with PDN 16.

FIG. 2 depicts that data structure of the message bodies of PDU Session Create Request message 42 and PDU Session Create Response message 44, which are exchanged between v-SMF 22 and h-SMF 24. As shown in FIG. 2, S-NSSAI 40 is included in both request message 42 and response message 44. V-SMF 22 and h-SMF 24 use S-NSSAI 40 to select the appropriate v-UPF 28 and h-UPF 30 and assign an appropriate QoS profile to the PDU session. User traffic is carried in General Packet Radio Service Tunneling Protocol User Plane (GTP-U) packets which is an IP tunneling protocol, wherein user packets are tunneled though GTP headers.

FIG. 2 shows that, in addition to S-NSSAI 40, the data structure of PDU Session Create Request message 42 (Nsmf_PDUSession_Create) contains GTP-U tunnel information for the selected v-UPF 28. Specifically, in PDU Session Create Request message 42, vcnTunnelInfo attribute 46 contains an Internet Protocol (IP) address of the selected v-UPF 28 and tunnel-ID of downlink GTP-U data path—i.e., the data path from h-UPF 30 to v-UPF 28.

FIG. 2 further depicts the data structure of PDU Session Create Response message 44 (Nsmf_PDUSessionCreate), which is the response message sent from h-SMF 24 to v-SMF 22. The PDU Session Create Response message includes S-NSSAI 40 and GTP-U tunnel information for the selected h-UPF 30. Specifically, hcnTunnelInfo attribute 48 contains the IP address of the selected h-UPF 30 and tunnel-ID of uplink GTP-U data path—i.e., the data path from v-UPF 28 to h-UPF 30.

Figure 3:
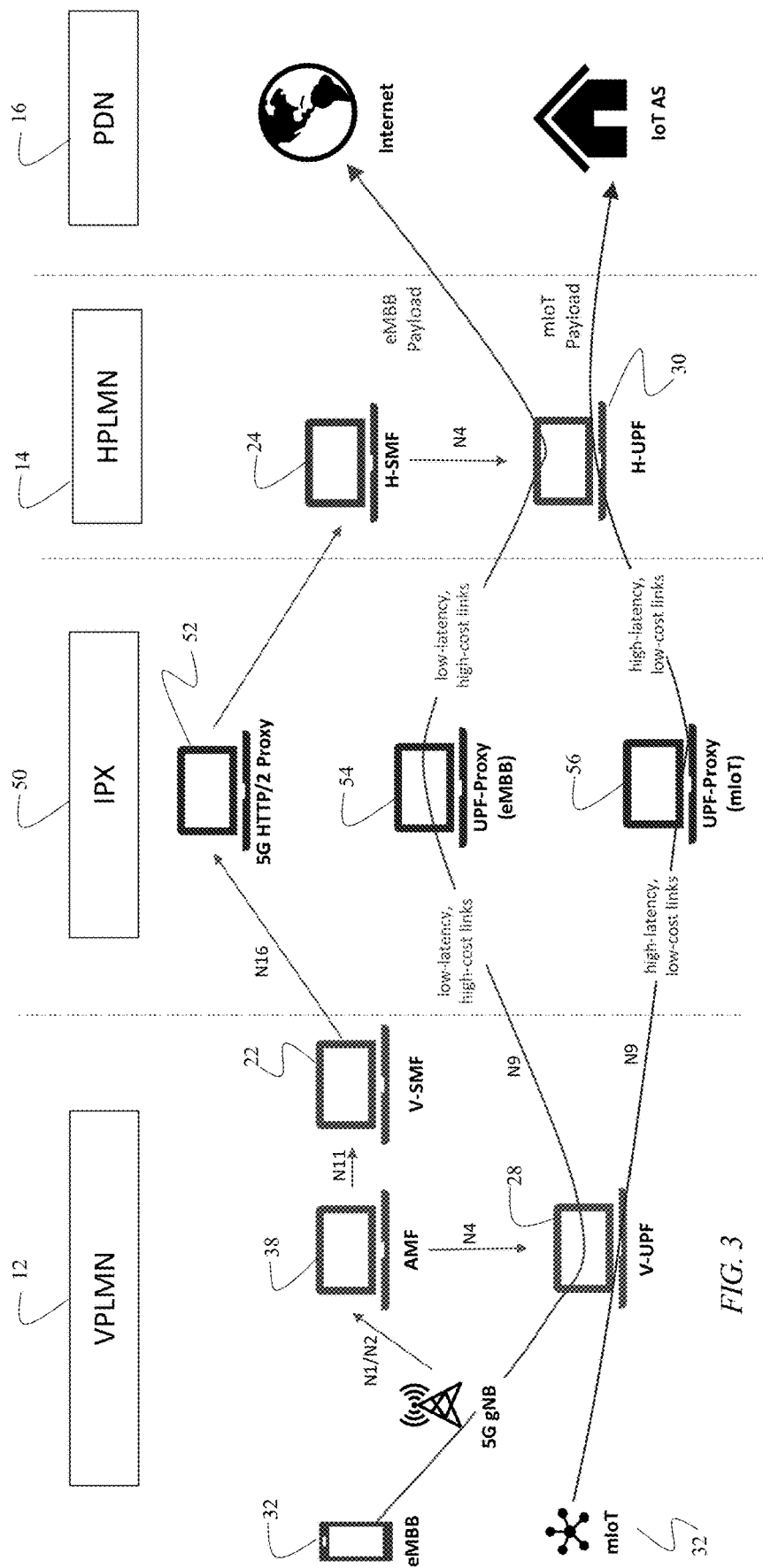
FIG. 3 is a block diagram schematically depicting an embodiment using UPF-Proxy approach. Enhanced Mobile Broadband (eMBB) data packets are steered through a dedicated UPF-Proxy for eMBB, whereas Massive Internet of Things (mIoT) data packets are steered through a dedicated UPF-Proxy for mIoT. Routing paths to and from UPF-Proxy for eMBB have low-latency at a higher cost whereas routing paths to and from UPF-Proxy for mIoT have high-latency at a lower cost.

An embodiment of the invention is depicted in FIG. 3. The network slicing selection procedure set forth in 3GPP does not address the needs of traffic routing in IPX network 50. The present invention addresses this problem by providing a novel and non-obvious method that uses S-NSAAI 40, the IP addresses of the selected v-UPF 28 and h-UPF 30, and tunnel IDs for downlink and uplink GTP-U data paths to enable network slicing in an IPX network 50.

FIG. 3 depicts that VPMN 12 and HPMN 14 are connected via IPX network 50. In home-routed roaming scenario, both signaling and user payload traffic traverse IPX network 50. In IPX network 50, there are multiple IP circuits connecting VPLMN 12 and HPLMN 14 for redundancy purpose, as well as to provide different QoS for different mobile user needs. The invention uses these multiple IP circuits to steer user traffic to different routing paths in IPX network 50, thereby enabling network slicing in IPX network 50.

As shown in FIG. 3, in an embodiment of the invention, a 5G HTTP/2 Proxy 52 is deployed in IPX network 50 between v-SMF 22 and h-SMF 24. 5G HTTP/2 Proxy 52 is configured to proxy HTTP/2 messages between VPLMN 12 and HPLMN 14. Specifically, 5G HTTP/2 Proxy 52 is configured to proxy PDU Session Create Request and Response messages 42 and 44 between v-SMF 22 and h-SMF 24. 5G HTTP/2 Proxy 52 is further configured to extract values of S-NSAAI 40, the IP addresses of the selected v-UPF 28 and h-UPF 30, and tunnel IDs for downlink and uplink GTP-U data paths with PDU Session Create Request and Response messages 42 and 44.

In the embodiment depicted in FIG. 3, traffic steering is implemented with the UPF-Proxy approach. In this embodiment, multiple UPF-Proxies (in this example, UPF-Proxy 54 and UPF-Proxy 56) are deployed in IPX network 50. Each UPF-Proxy 54/56 is configured to handle traffic corresponding to a predefined use case category. For example, FIG. 3 depicts a first UPF-Proxy 54 configured for eMBB traffic and a second UPF-Proxy 56 configured for mIoT traffic. IP links to/from first UPF-Proxy 54 for eMBB have low-latency but high-cost, whereas IP links to/from second UPF-Proxy 56 for mIoT have high-latency but low-cost. By selecting the UPF-Proxy that is best suited for a particular type of traffic, the invention enables network slicing via IPX network 50.

As will be discussed in more detail below with reference to FIG. 4, 5G HTTP/2 Proxy 52 mediates GTP-U tunnel information (vcnTunnelInfo attribute 46 and hcnTunnelInfo attribute 48) in PDU Session Create Request and Response messages 42 and 44. As a result of this mediation both v-UPF 28 and h-UPF 30 become configured to route traffic to either first UPF-Proxy 54 or to second UPF-Proxy 56. In this manner, GTP-U data in N9 interface from v-UPF 28 to h-UPF 30 is anchored at the dedicated UPF-Proxy 54/56 in IPX network 50 for specific use cases, such as eMBB and mIoT.

Figure 4:
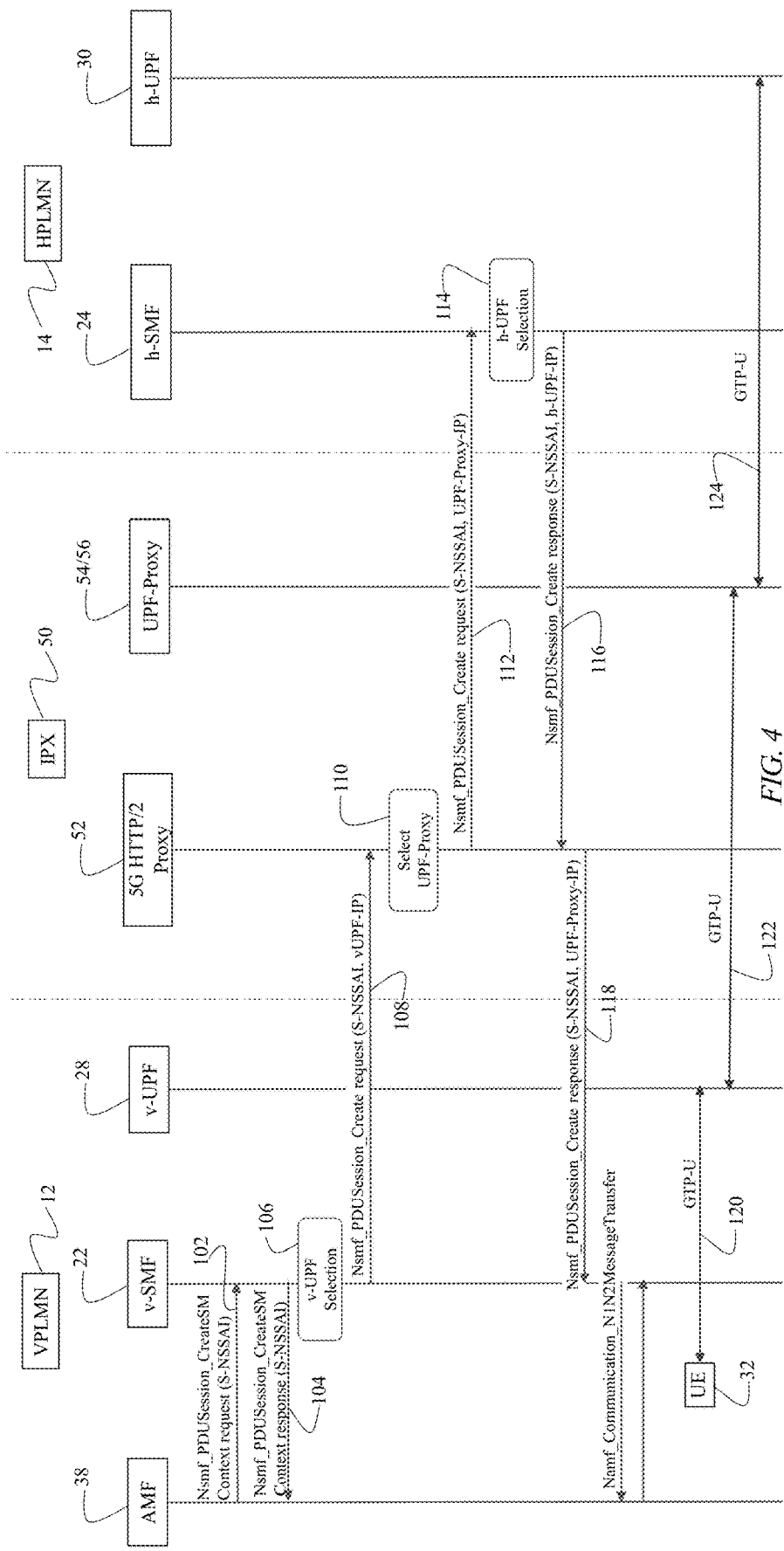
FIG. 4 is a sequential diagram schematically depicting the call flow for a PDU session with UPF-Proxy approach. Nsmf_PDUSession_Create request and response messages are proxied at 5G HTTP/2 Proxy deployed at the IPX network. After PDU Session is established, GTP-U data packets between v-UPF and h-UPF are proxied at the UPF-Proxy selected according to S-NSSAI value associated with the PDU Session.

In the embodiment depicted in FIG. 4, traffic steering with UPF-Proxy 54/56 approach is illustrated. Responsive to receiving a request from UE 32 to establish PDU session, in step 102, AMF 38 sends a PDU Session Create Context (Nsmf_PDUSession_Create SMContext) request to v-SMF 22. This request carries the S-NSSAI value 40 indicating the category of the desired service (eMBB, mIoT, uRLLC, etc). In step 104, v-SMF 22 replies to AMF 38 with a PDU Session Create Context (Nsmf_PDUSession_Create SMContext) response. Next, in step 106, v-SMF 22 performs a UPF selection procedure based on the received S-NSSAI value 40.

In step 108, v-SMF sends a PDU Session Create request 42 (Nsmf_PDUSession_Create request) toward h-SMF 24 via 5G HTTP/2 Proxy 52. PDU Session Create request 42 carries S-NSSAI value 40 and IP address of the selected v-UPF 28. In step 110, 5G HTTP/2 Proxy 52 performs UPF-Proxy selection procedure to determine the best UPF-Proxy 54 or 56 based on the type of traffic indicated by S-NSSAI value 40 and geographical location of VPLMN 12 and HPLMN 14. In this example, 5G HTTP/2 Proxy 52 is configured to select first UPF-Proxy 54 if S-NSSAI value 40 indicates eMBB traffic or, alternatively, to select second UPF-Proxy 56 if S-NSSAI value 40 indicates mIoT traffic.

Next, 5G HTTP/2 Proxy 52 mediates PDU Session Create request message 42 by replacing the IP address of v-UPF 28 with the IP address of selected UPF-Proxy 54/56. By replacing the IP address in PDU Session Create request 42, subsequent downlink GTP-U traffic from h-UPF 30 will be routed to the selected UPF-Proxy 54/56. In step 112, the modified PDU Session Create request message 42 is sent to h-SMF 24.

In step 114, h-SMF 24 selects an appropriate h-UPF 30 based on S-NSSAI value 40 in PDU Session Create request 42. In step 116, h-SMF 24 replies to PDU Session Create request 42 with PDU Session Create response 44, which carries the IP address of the selected h-UPF 30. PDU Session Create response 44 is sent via a 5G HTTP/2 Proxy 52 in IPX network 50. 5G HTTP/2 Proxy 52 mediates PDU Session Create response 44, replacing the IP address of h-UPF 30 with the IP address of the selected UPF-Proxy 54/56. Thus, subsequent uplink GTP-U traffic from v-UPF 28 will be routed to the selected UPF-Proxy 54/56. It shall be noted that 5G HTTP/2 Proxy may select different UPF-Proxies 54/56 for uplink (from v-UPF 28 to h-UPF 30) and downlink (from h-UPF 30 to v-UPF 28) GTP-U (asymmetric traffic).

In step 118, 5G HTTP/2 Proxy 52 sends the modified PDU Session Create response 46 to v-SMF 22 to establish the PDU session. In steps 120-124, subsequent data traffic is routed between v-UPF 28 and h-UPF 30 via the appropriate UPF-Proxy (in this example, UPF-Proxy 54 for eMBB traffic or UPF-Proxy 56 for mIoT traffic).

Figure 5:
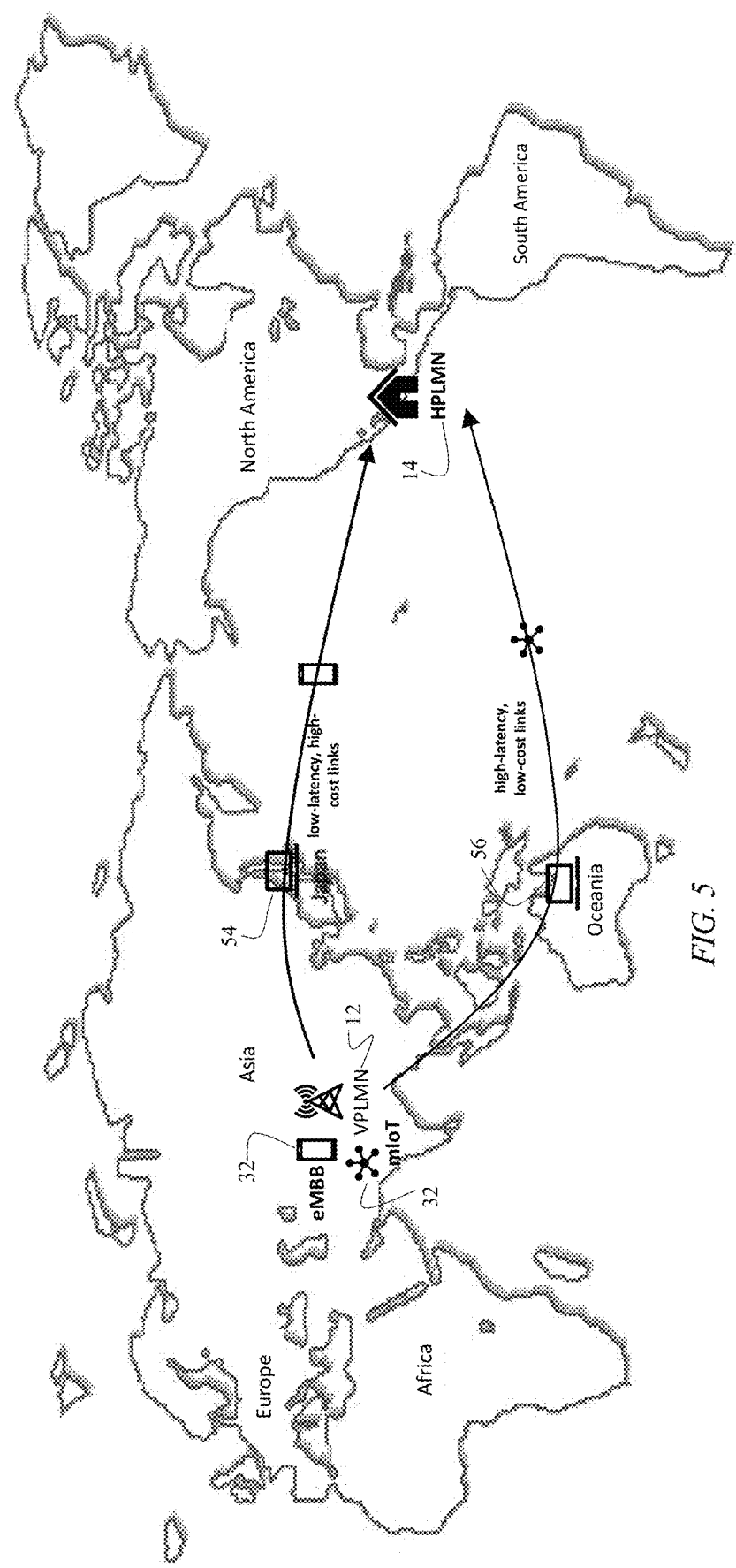
FIG. 5 is a diagram depicting mobile device data paths being routed through different IP links located in different parts of the world. The eMBB traffic is routed through low-latency, high-cost links, whereas the mIoT traffic are routed through high-latency, low-cost links.

FIG. 5 illustrates that data traffic may be steered through different IP links via UPF-Proxies 54/56 that may be deployed in different parts of the world. For example, FIG. 5 depicts that first UPF-Proxy 54 is deployed in Japan, while second UPF-Proxy 56 is deployed in Oceania. In this example, first UPF-Proxy 54 is used for IP links that have low latency. Although these IP links may have a high cost, they may nevertheless be preferable in use cases for which low latency is key, for example eMBB traffic. FIG. 5 further depicts that IP links routed through second UPF-Proxy 56 deployed in Oceania may have lower cost, but higher latency. These lower cost IP links may be preferable for mIoT traffic, for which cost savings may outweigh the increased latency.

Figure 6:
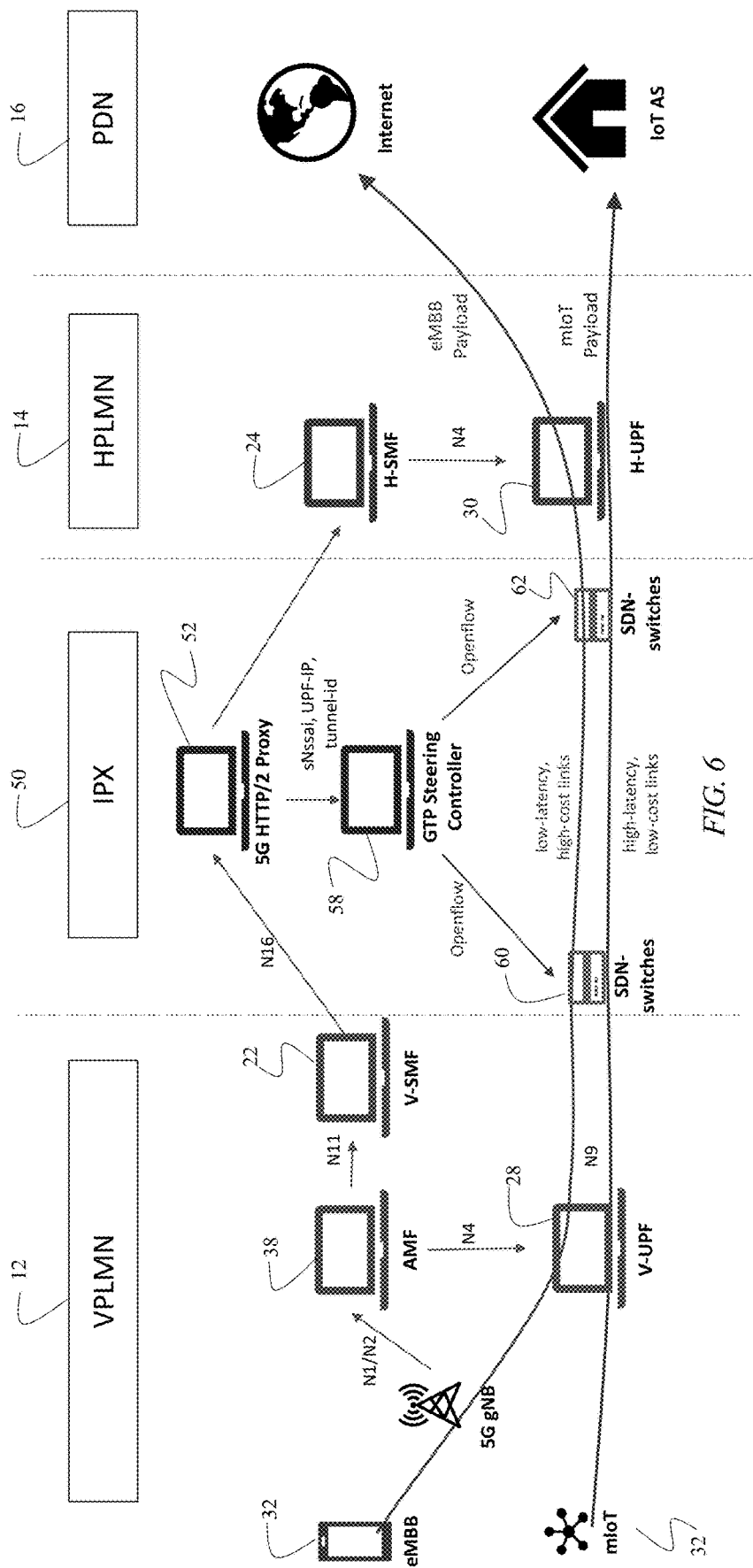
FIG. 6 is a block diagram schematically depicting an embodiment using the SDN approach. A GTP Steering Controller is deployed to act as OpenFlow Controller to control SDN-switches. GTP-U traffic for eMBB and mIoT data is steered through different IP links. The IP links for eMBB have low-latency at higher-cost, whereas IP links for mIoT have high-latency at lower-cost.

In the embodiment depicted in FIG. 6, traffic steering is implemented with Software-Defined Networking (SDN) approach. In this embodiment, a GTP Steering Controller 58 is deployed in the IPX network 50. The GTP Steering Controller 58 acts as OpenFlow Controller to control SDN-switches 60 and 62 using the Openflow protocol.

In this embodiment, 5G HTTP/2 Proxy 52 intercepts the PDU Session Create Request and Response messages 42 and 44 but does not modify their attributes. Instead, 5G HTTP/2 Proxy 52 extracts S-NSSAI value 40, IP address of v-UPF 28, IP address of h-UPF 30, and GTP-U tunnel ID from messages 42 and/or 44 and passes these values to GTP Steering Controller 58.

In this embodiment, a plurality of SDN switches—e.g., SDN-switches 60 and 62—are deployed in the IPX network 50. Openflow matching and action rules are installed at each SDN-switch 60/62 for each PDU-Session based on the extracted IP address of the v-UPF, IP address of the h-UPF, and tunnel-ID, such that subsequent GTP-U traffic is steered to the desired IP links. For example, GTP-U traffic for eMBB is steered through a different routing path than GTP-U traffic for mIoT. The routing path (IP links) for eMBB have low-latency at higher-cost whereas the routing path (IP links) for mIoT have high-latency at lower-cost.

Figure 7:
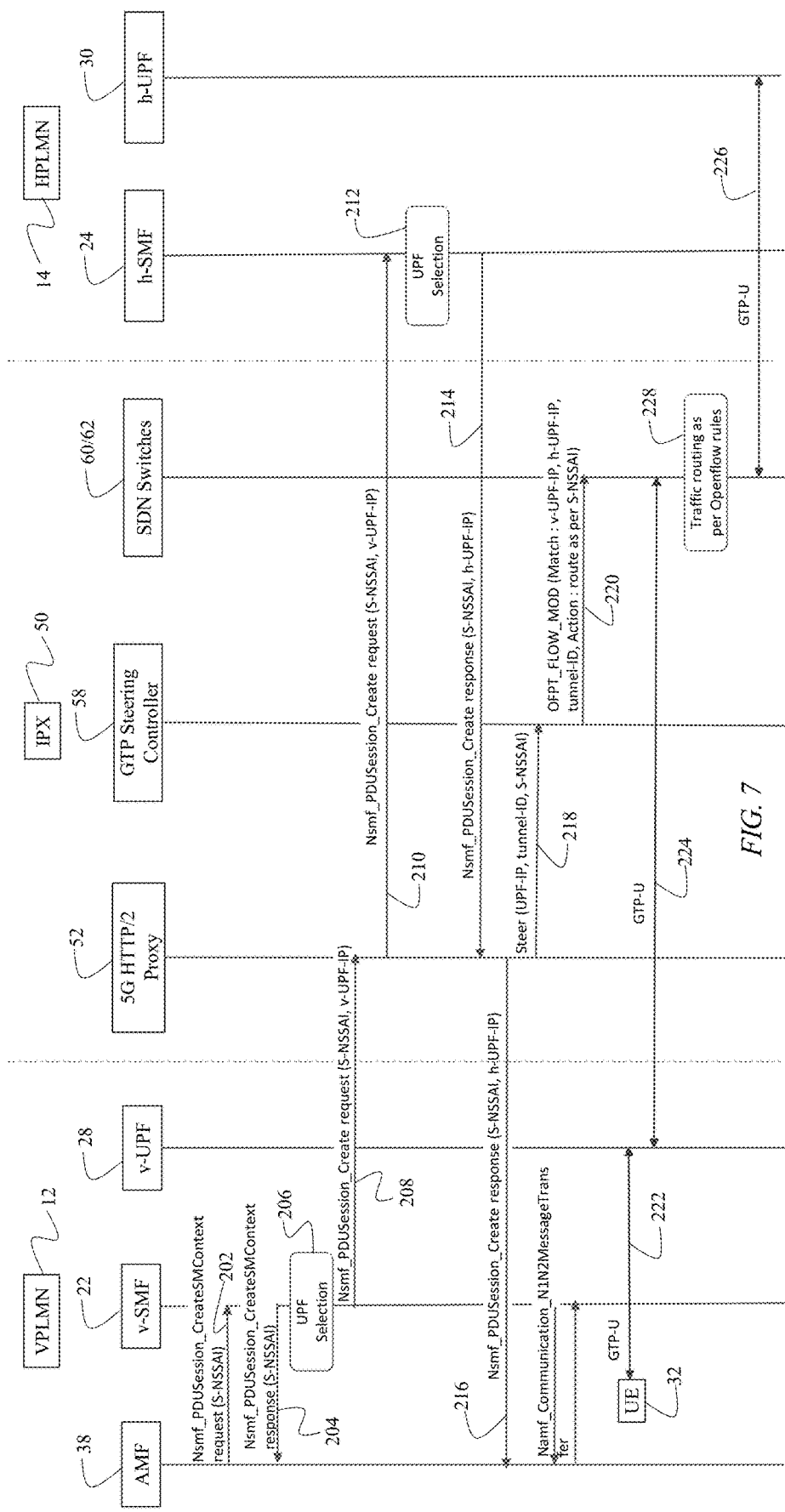
FIG. 7 is a sequential diagram schematically depicting the call flow for a PDU session with SDN approach. Nsmf_PDUSession_Create request and response messages are proxied at 5G HTTP/2 Proxy deployed at the IPX. GTP Steering Controller receives information from 5G HTTP/2 Proxy about the S-NSSAI and UPF IP during PDU Session establishment, and sends OpenFlow commands to SDN switches to install Openflow rules for traffic routing. After PDU Session is established, GTP-U data packets between v-UPF and h-UPF are routed via different IP paths selected by SDN switches according to PDU Session's S-NSSAI value.

FIG. 7 provides a signaling flow diagram illustrating data traffic steering for the embodiment depicted in FIG. 6. In step 202, AMF 38 sends a PDU Session Create Context (Nsmf_PDUSession_Create SMContext) request to v-SMF 22. This request carries the S-NSSAI value 40. In step 204, v-SMF 22 replies to AMF 38 with a PDU Session Create Context (Nsmf_PDUSession_Create SMContext) response. Next, in step 206, v-SMF 22 performs a v-UPF selection procedure based on the received S-NSSAI value 40.

In step 208, v-SMF 22 sends PDU Session Create request message 42, carrying the S-NSSAI 40 and IP address of v-UPF 28. 5G HTTP/2 Proxy 52 intercepts PDU Session Create request message 42 and extracts the S-NSSAI 40 and IP address of v-UPF 28. In step 210, 5G HTTP/2 Proxy 52 sends PDU Session Create request message 42 to h-SMF 24. In step 212, h-SMF 24 selects h-UPF 30. In step 214, h-SMF 24 sends PDU Session Create response message 44. This message is also captured by 5G HTTP/2 Proxy 52. 5G HTTP/2 Proxy 52 extracts IP address of the selected h-UPF 30 from the PDU Session Create response message 44. In step 216, 5G HTTP/2 Proxy 52 sends PDU Session Create response message 44 to AMF 38.

Next, 5G HTTP/2 Proxy 52 executes its logic to select appropriate routing path/IP link between v-UPF 28 and h-UPF 30 for the PDU Session according to the S-NSSAI value 40 and geographic location of VPMN 12 and HPMN 14. In step 218, 5G HTTP/2 Proxy 52 sends a command to the GTP Steering Controller 58 to perform steering. The command contains the PDU session information including IP address of v-UPF 28, IP address of h-UPF 30, uplink and downlink GTP-U tunnel-id and S-NSSAI 40. In step 220, GTP Steering Controller 58 sends Openflow commands to SDN-switches 60/62 to create rules to perform traffic steering (OFPT_FLOW_MOD), which is a 'Modify Flow Table' message. The matching rule is the GTP-U IP 5-tuple (source-IP, source-port, destination-IP, destination-port and IP protocol), together with the uplink and downlink GTP-U tunnel-id. The action rule is to determine which egress network interface port the traffic shall be delivered to. It shall be noted that the IP path/link for uplink (from v-UPF 28 to h-UPF 30) and downlink (from h-UPF 30 to v-UPF 28) GTP-U may be different (asymmetric traffic).

In steps 222-226, after the PDU session is established, subsequent data packets sent between VPLMN 12 and HPLMN 14 are delivered to SDN Switches 60/62. In step 228, SDN Switches 60/62 route the data packets according to the Openflow rules established in step 220. In this manner, the data packets are steered via the routing path in the IPX network that is best suited for handling them based on their type—i.e., an eMBB, a mIoT and an uRLLC.

Software and Hardware Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of routing 5G roaming mobile data traffic between a visited public land mobile network (VPLMN) and a home public land mobile network (HPLMN) interconnected via an Internetwork Packet Exchange (IPX) network having a plurality of predefined routing paths, comprising:
  capturing, within the IPX network, a Protocol Data Unit (PDU) Session Create request message from the VPLMN, wherein the PDU Session Create request message carries a Single-Network Slice Selection Assistance Information (S-NS SAI) value and an Internet Protocol (IP) address of a visited User Plane Function (v-UPF);
  identifying the S-NSSAI value within the PDU Session Create request message;
  selecting a first routing path from the plurality of predefined routing paths in the IPX network based on the S-NSSAI value identified from the PDU Session Create Request message, wherein the first routing path is associated with a first UPF-Proxy deployed in the IPX network, the first routing path configured to provide a predefined Quality of Service (QoS) for data traffic associated with the S-NSSAI value;
  modifying the PDU Session Create Request message by replacing the IP address of the v-UPF with an IP address of the first UPF-Proxy, thereby creating a modified PDU Session Create request message;
  sending the modified PDU Session Create request message to the HPLMN;
  capturing, within the IPX network, a PDU Session Create response message from the HPLMN, wherein the PDU Session Create response message carries an IP address of the home User Plane Function (h-UPF);
  modifying the PDU Session Create response message by replacing the IP address of the h-UPF with an IP address of a second UPF-Proxy associated with a second routing path in the IPX network, thereby creating a modified PDU Session Create response message; and
  sending the modified PDU Session Create response message to the VPLMN;
  wherein subsequent uplink data packets from the VPLMN to the HPLMN are delivered to the first UPF-Proxy via the first routing path in the IPX network, and wherein subsequent downlink data packets from the HPLMN to the VPLMN are delivered to the second UPF-Proxy via the second routing path in the IPX network.

2. The method of claim 1, wherein the second routing path is the same as the first routing path and the second UPF-Proxy is the same as the first UPF-Proxy.

3. The method of claim 1, wherein the second routing path is different than the first routing path and the second UPF-Proxy is different than the first UPF-Proxy.

4. The method of claim 1, wherein a geographic location of the VPLMN or the HPLMN is used as a factor in selecting the first routing path, the second routing path, or both.

5. The method of claim 1, wherein the an 'ipv4Addr' value or an 'ipv6Addr' value in a 'vcnTunnelInfo' attribute of the PDU Session Create Request message is replaced with the IP address of the first UPF-Proxy.

6. The method of claim 1, wherein the an 'ipv4Addr' value or an 'ipv6Addr' value in a 'hcnTunnelInfo' attribute of the PDU Session Create Response message is replaced with the IP address of the second UPF-Proxy.

7. The method of claim 1, wherein each of the plurality of the predefined routing paths in the IPX network has one or more attributes associated with a 5G use case.

8. The method of claim 7, wherein the 5G use case is selected from the group consisting of an Enhanced Mobile Broadband (eMBB), Massive Internet Of Things (mIoT), and Ultra-Reliable and Low Latency Communications (uRLLC).

9. The method of claim 7, wherein the one or more attributes associated with the 5G use case is selected from the group consisting of bandwidth, latency, cost, capacity, and reliability.

* * * * *